UNITED STATES PATENT OFFICE.

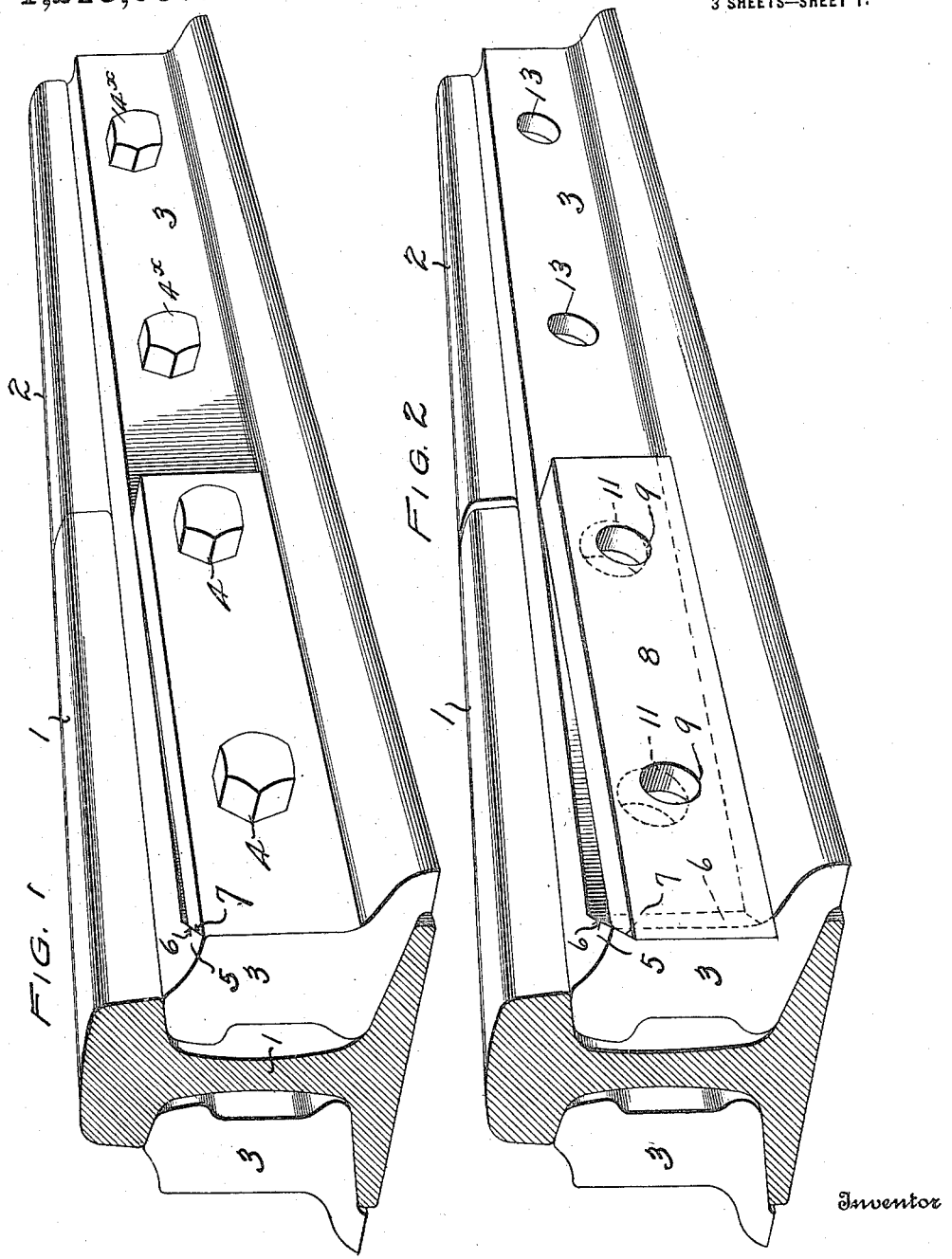

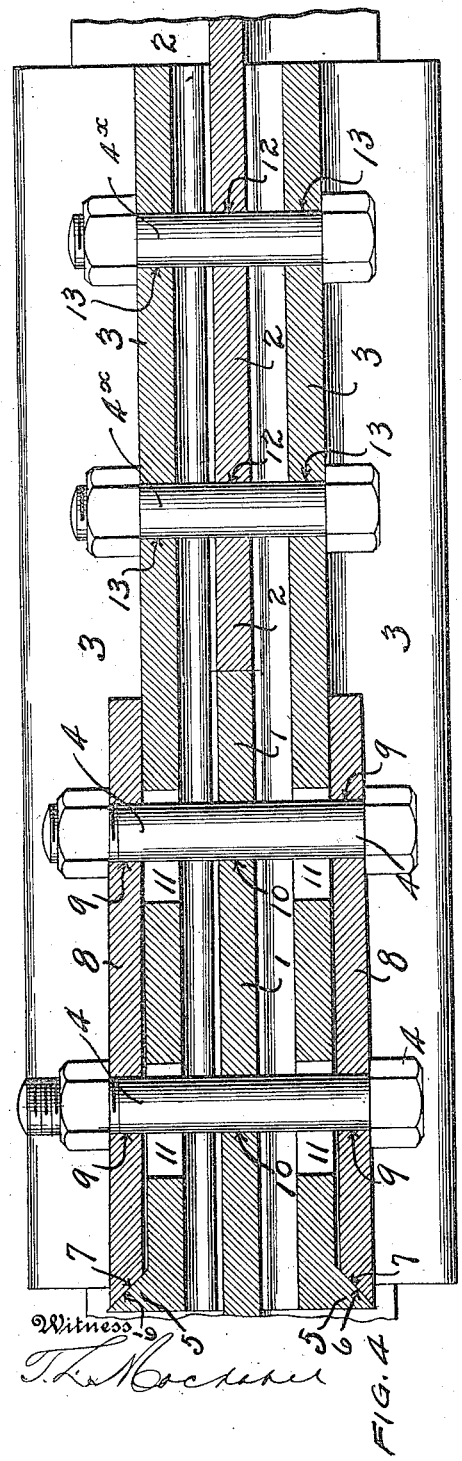
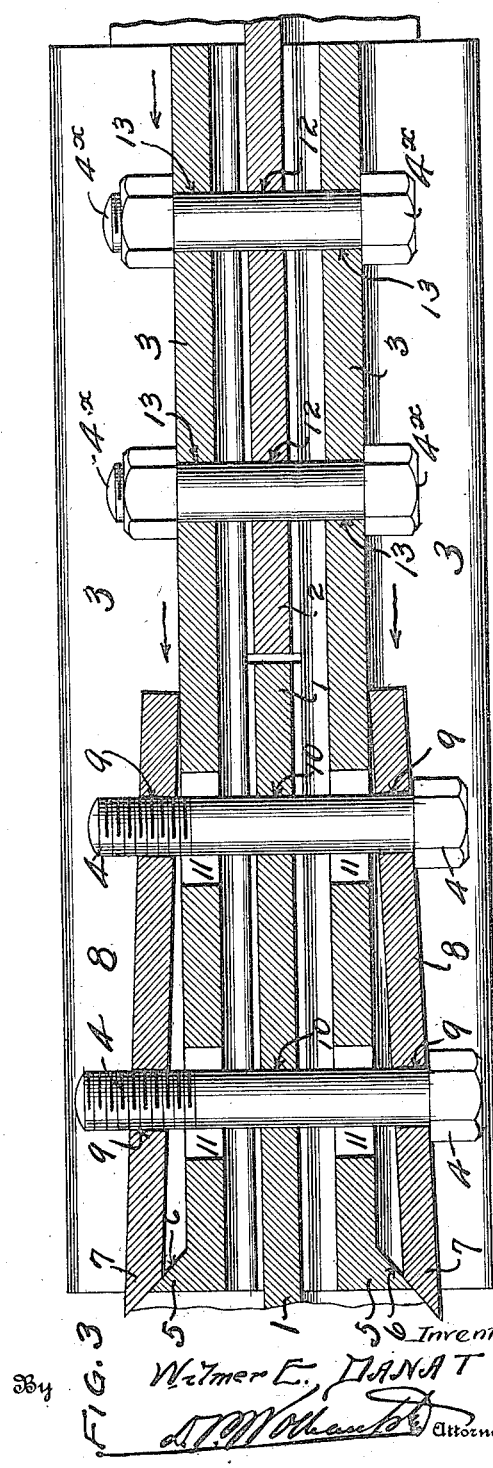

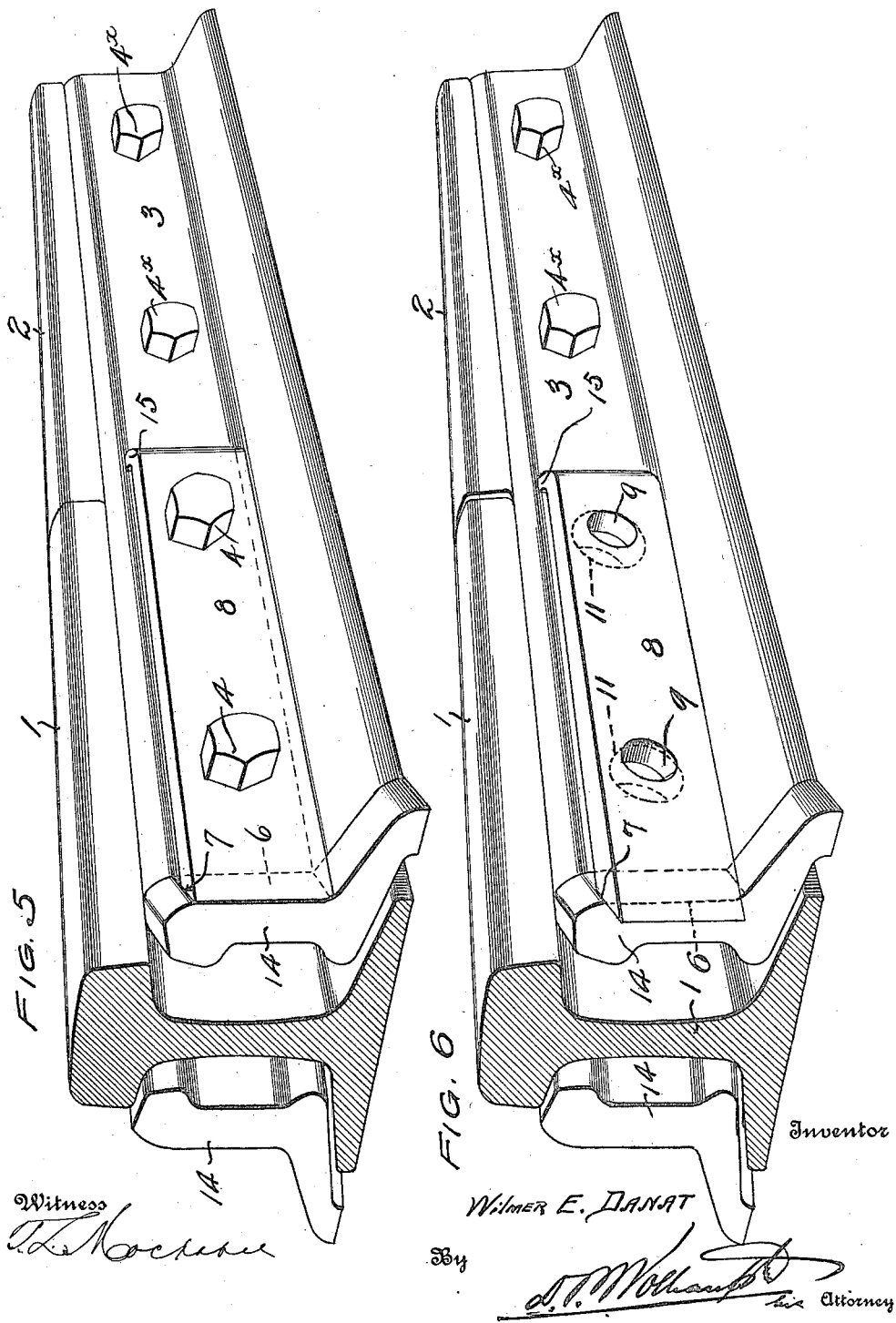

WILMER E. DANAT, OF BUFFALO, NEW YORK, ASSIGNOR TO THE RAIL JOINT COMPANY, OF NEW YORK, N. Y., A CORPORATION OF NEW YORK.

RAIL-JOINT.

1,215,003.

Specification of Letters Patent.

Patented Feb. 6, 1917.

Application filed July 22, 1915. Serial No. 41,365.

*To all whom it may concern:*

Be it known that I, WILMER E. DANAT, a citizen of the United States, residing at Buffalo, in the county of Erie and State of New York, have invented certain new and useful Improvements in Rail-Joints, of which the following is a specification.

This invention relates to an improvement in rail joints particularly of the type designed for maintaining the rails permanently in a closely abutting relation.

To this end, the primary object of the invention is to provide a novel and practical construction of rail joint possessing special utility as a substitute for rail connections which are formed by welded joints or welded rail ends. In this class of rail joints, a distinctive feature thereof is the provision of means for maintaining a continuous unbroken tread which is especially desirable in street railway track construction, and this function is performed by the present invention without the employment of a weld either of the joint parts or of the rail ends, but primarily through the instrumentality of the joint bolts.

Accordingly, the principal object of the present invention is to provide an improvement readily applicable to the ordinary joint bolts and to any suitable form of splice bar, while at the same time having the capacity of drawing the rail ends into closely abutting contact, and so maintaining them through the tightening of the joint bolts.

With these and other objects in view which will be recognized by those familiar with devices of this character, the invention consists in the novel construction, combination and arrangement of parts, hereinafter more fully described, illustrated, and claimed.

The essential feature of the invention involved in the means for forcing the splice bar in a direction to close the gap between the rail ends is necessarily susceptible of a wide range of structural modification without departing from the scope of the invention, as defined in the appended claims, but certain preferred embodiments thereof are shown in the accompanying drawings, in which—

Figure 1 is a perspective view of a closed rail joint, embodying the improvement contemplated by the present invention; the view illustrating the joint parts in their final positions and the rail ends abutting.

Fig. 2 is a similar view illustrating the joint bolts removed and the parts in the positions which they occupy prior to the application and tightening of the bolts.

Fig. 3 is a horizontal sectional view through the joint with the various parts thereof in the assembled positions which they occupy prior to the tightening of the joint bolt.

Fig. 4 is a view similar to Fig. 3 with the joint parts in the final positions into which they are drawn by the tightening of the joint bolts.

Figs. 5 and 6 are views similar to Figs. 1 and 2 illustrating a modification that may be resorted to.

Similar reference characters designate corresponding parts throughout the several figures of the drawings.

In carrying forward the invention, the improvements which constitute the same are applicable to any conventional or practical form of splice bar, and in fact may be utilized in any rail joint construction wherein the usual joint bolts are available as a means for positively drawing the rail ends into closely abutting contact, and maintaining them in that condition. To illustrate this, reference will be made to the drawings in which Figs. 1 and 2 show a rail joint including the adjoining rails 1 and 2, the opposite joint bars 3—3, and the usual series of joint bolts 4—4$^x$. As stated, each joint bar 3 may be any suitable form of splice, but according to the present invention the same is provided, preferably at or adjacent one end thereof, with a laterally offset bearing projection 5 formed upon its outer side with an inclined wedging face 6 which coöperates with a similarly inclined wedging face 7 formed at one end portion of an auxiliary clamping plate 8.

The auxiliary clamping plate 8, associated with each joint bar, constitutes the outside bolting plate for the joint, and is provided therein with the bolt holes 9 receiving the end portions of the set of bolts 4 which pass through the web of one of the rails (1). These joint bolts 4, for one of the rails, snugly fit in the bolt holes 9 of the opposite clamping plates 8 and also have a snug fit in the bolt holes 10 of the rail 1. At the same time, the said bolts 4 extend through enlarged clearance holes 11 formed in one end portion of each joint bar 3, so that in a relative sense the bolts 4 for one rail may be said to have a coupled or fast connection with the said rail and the auxiliary clamping bars 8, and to be disengaged or free from the two joint bars 3.

With respect to the bolts 4× for the other rail (2), these bolts have a snug fit in the bolt holes 12 and 13 respectively of the said rail 2 and in one end portion of both joint bars 3. By reason of this relation of the joint bars 3 to the rail 2 and the joint bolts 4×, the said joint bars, in a relative sense, have a coupled or fastened connection with one of the rails (2) of the joint. Consequently, with the parts in their initial assembled relation shown in Fig. 3 of the drawings, a tightening of the joint bolts 4—4 brings the inclined wedging faces 7 of the clamping plates 8 into sliding engagement with the corresponding faces 6 of the joint bars. A continued tightening of the bolt therefore provides a cam-like action which forcibly moves the two joint bars in a direction which carries the rail 2 coupled therewith into close abutting relation with the rail 1. This abutting relation of the two rails may be effectually maintained, as will be apparent, by the thorough tightening of all of the joint bolts at the time the joint is put in track.

By way of showing the general scope of the improvement, reference is made to Figs. 5 and 6 of the drawings. In these figures, there is illustrated a modification which mainly consists in bending outwardly one end portion of an ordinary angle bar, as at 14, to provide the wedging face 6 previously explained. Also the modification referred to illustrates another detail, namely that of optionally forming the auxiliary clamping plate 8 at the end opposite the face 7 with an inturned fulcrum projection 15 which bears against the outer face of the joint bar, and thereby produces more or less of a leverage effect for the plate 8 when the bolts 4—4 are tightened to force the face 7 against the face 6.

Other equivalent modifications of the invention will be resorted to, as well as changes in the form, proportion and minor details of construction without departing from the spirit or sacrificing any of the advantages of the invention.

I claim:

1. A rail joint including, in combination, the rails, a joint bar, the joint bolts, and a device coöperating with the joint bar and the joint bolts for forcing the rail ends into abutting contact upon the tightening of the bolts.

2. A rail joint including, in combination, the rails, a joint bar having a rigid connection with one rail, the joint bolts, and means for moving said bar in a direction to carry the rail coupled therewith into abutting contact with the other rail.

3. A rail joint including, in combination, the rails, the joint bolts, a joint bar rigidly connected by certain of said bolts with one rail, and means, actuated by other joint bolts, for moving said joint bar in one direction.

4. A rail joint including, in combination, the rails, the joint bolts, a joint bar rigidly connected by certain of said bolts with one rail, and means, actuated by the tightening of other ones of said bolts, for moving said joint bar in a direction to bring the rail ends into abutting contact.

5. A rail joint including, in combination, the rails, the joint bolts, a joint bar rigidly coupled with one rail, and a device operated by the tightening of certain of the joint bolts and having a cam-like engagement with the joint bar to move it and the rail coupled therewith in one direction.

6. A rail joint including, in combination, the rails, the joint bolts, a joint bar coupled with one rail, and a clamping plate carried by certain of the joint bolts and having a cam-like engagement with the joint bar.

7. A rail joint including, in combination, the rails, the joint bolts, a joint bar coupled with one rail, and a clamping plate carried by certain of the joint bolts and having a cam-like engagement with the joint bar to move the latter and the rail coupled therewith in one direction.

8. A rail joint including, in combination, the rails, the joint bolts, a joint bar coupled by certain of the bolts to one rail and slidably connected with the other rail, and a clamping plate carried by other joint bolts, and having a cam-like engagement with the joint bar.

9. A rail joint including, in combination, the rails, the joint bolts, a joint bar having a rigid connection with one rail through certain joint bolts and provided with a projection, and a clamping plate having a cam-like engagement with said projection.

10. A rail joint including, in combination, the rails, the joint bolts, a joint bar having a rigid connection with one rail through certain joint bolts and provided with a projection, and a clamping plate carried by certain of the joint bolts and having a cam-like engagement with said projection.

11. A rail joint including, in combination, the rails, the joint bolts, a joint bar having a rigid connection with one rail through certain of the joint bolts and provided at one end portion with a projection, and a clamping plate provided at one end with a wedging face engaging said projection.

12. A rail joint including, in combination, the rails, the joint bolts, a joint bar having a fast connection with the joint bolts for one rail, and a clearance from the joint bolts for the other rail, and a clamping plate carried by said latter joint bolts and adjustable inwardly thereby, said clamping plate having a cam-like engagement with the joint bar.

13. A rail joint including, in combination, the rails, the joint bolts, a joint bar having a fast connection with the joint bolts for one rail and provided at one end with a projection presenting a beveled wedging face, and a clamping plate carried by the joint bolts for the other rail and adjustable inwardly thereby, said plate having a wedging face engaging that of said projection.

In testimony whereof I hereunto affix my signature in the presence of two witnesses.

WILMER E. DANAT.

Witnesses:
ALFRED C. DANAT,
HENRY A. STEVENS.